US012483016B2

(12) United States Patent
Witherbee et al.

(10) Patent No.: US 12,483,016 B2
(45) Date of Patent: Nov. 25, 2025

(54) ACOUSTIC TEE MOUNTING CLIP FOR ELECTRICAL BOX SUPPORT BRACKET

(71) Applicant: Eaton Intelligent Power Limited, Dublin (IE)

(72) Inventors: Martin Lee Witherbee, Highland, IL (US); Shane Amedeo Semple, Canonsburg, PA (US)

(73) Assignee: Eaton Intelligent Power Limited, Dublin (IE)

( * ) Notice: Subject to any disclaimer, the term of this patent is extended or adjusted under 35 U.S.C. 154(b) by 132 days.

(21) Appl. No.: 18/423,082

(22) Filed: Jan. 25, 2024

(65) Prior Publication Data

US 2024/0258780 A1  Aug. 1, 2024

Related U.S. Application Data

(60) Provisional application No. 63/481,673, filed on Jan. 26, 2023.

(51) Int. Cl.
*H02G 3/10* (2006.01)
*F16B 5/02* (2006.01)

(52) U.S. Cl.
CPC ............. *H02G 3/10* (2013.01); *F16B 5/0208* (2013.01)

(58) Field of Classification Search
CPC ............ H02G 3/10; H02G 3/125; H02G 3/12; H02G 3/08; H02G 3/081; H02G 3/086;
(Continued)

(56) References Cited

U.S. PATENT DOCUMENTS

| 4,603,789 A | 8/1986 | Medlin |
| 4,723,746 A | 2/1988 | Gould |

(Continued)

FOREIGN PATENT DOCUMENTS

| CA | 1275486 C | 10/1990 |
| CA | 2591548 C | 7/2010 |

(Continued)

OTHER PUBLICATIONS

Orbit Industries, Inc., Simple Support Bracket Family, available at https://www.orbitelectric.com/docs/literatures/catalogs/SSB_Family_Brochure.pdf, downloaded on Jan. 25, 2024, 8 pages.

(Continued)

*Primary Examiner* — Angel R Estrada
(74) *Attorney, Agent, or Firm* — Baker Botts L.L.P.

(57) ABSTRACT

An acoustic tee mounting clip is configured to couple a ceiling bracket to a ceiling member. The acoustic tee mounting clip comprises a body having a lower portion, an upper portion, a first arm, and a second arm. The upper portion transitions to the lower portion through an offset connection portion being angled inward such that a portion of the lower portion is more inward relative to a portion of the upper portion. The upper portion comprises a first bent portion, a second bent portion, and a first cut-out, the first cut-out being disposed between the first bent portion and the second bent portion. The first and second arms are respectively disposed at distal ends of the first and second bent portions, wherein the first arm and the second arm bend outward from the distal ends and are configured to be fastened to a horizontal surface of the ceiling bracket.

20 Claims, 12 Drawing Sheets

(58) Field of Classification Search
CPC ...... H02G 3/121; H02G 3/123; F16B 5/0208; F16B 2/06; F16B 2/18; F16B 2/22; F16B 2/065; F16B 2/245; F16B 7/04; F16B 7/0493; F16B 2/20; F16B 2/00; F16B 2/02; E04B 9/00
USPC ....... 174/491, 480, 481, 50, 520, 58, 59, 61, 174/63; 248/200.1, 205.1, 906, 218.4, 248/200; 220/3.2, 3.3, 4.02
See application file for complete search history.

(56) References Cited

U.S. PATENT DOCUMENTS

| | | | |
|---|---|---|---|
| 4,757,908 A | 7/1988 | Medlin | |
| 4,790,505 A | 12/1988 | Rose | |
| 4,964,525 A | 10/1990 | Coffey | |
| 5,098,046 A | 3/1992 | Webb | |
| 5,114,105 A | 5/1992 | Young | |
| 5,176,345 A | 1/1993 | Medlin | |
| 5,288,041 A | 2/1994 | Webb | |
| 5,423,499 A | 6/1995 | Webb | |
| 5,595,362 A | 1/1997 | Rinderer | |
| 6,098,939 A | 8/2000 | He | |
| 6,209,836 B1 | 4/2001 | Swanson | |
| 6,323,424 B1 | 11/2001 | He | |
| 6,327,758 B1* | 12/2001 | Petrakis | E04B 9/16 24/336 |
| 6,996,943 B2 | 2/2006 | Denier | |
| 7,036,782 B2 | 5/2006 | Cheatham | |
| 7,243,891 B2 | 7/2007 | Wu | |
| D584,236 S | 1/2009 | Wegner | |
| 7,552,567 B2 | 6/2009 | Ingratta | |
| 7,637,385 B2 | 12/2009 | Wegner | |
| 7,735,794 B1 | 6/2010 | Gretz | |
| 7,784,755 B1 | 8/2010 | Johnson | |
| 7,798,458 B2 | 9/2010 | Borbolla | |
| 8,013,243 B2 | 9/2011 | Korcz | |
| 8,042,776 B2 | 10/2011 | Johnson | |
| 8,091,721 B1 | 1/2012 | Gretz | |
| 8,297,579 B1 | 10/2012 | Gretz | |
| 8,475,014 B2 | 7/2013 | Jones | |
| 8,702,047 B2 | 4/2014 | Nuernberger | |
| 8,770,526 B2* | 7/2014 | Siddiqui | H02G 3/125 248/200.1 |
| 9,091,051 B2 | 7/2015 | Baxter | |
| 9,194,123 B2 | 11/2015 | Holdridge | |
| 9,300,119 B2 | 3/2016 | Korcz | |
| 9,397,491 B2 | 7/2016 | Birli | |
| D769,706 S | 10/2016 | Jankovec | |
| 9,822,926 B2* | 11/2017 | Nikayin | H02G 3/12 |
| 9,887,524 B1 | 2/2018 | Gretz | |
| D816,475 S | 5/2018 | Ochi | |
| 9,982,837 B2 | 5/2018 | Zhang | |
| 10,135,232 B2 | 11/2018 | Nikayin | |
| D841,804 S | 2/2019 | Sommer | |
| D845,120 S | 4/2019 | Kosidlo | |
| 10,256,613 B2 | 4/2019 | Korcz | |
| 10,408,247 B2* | 9/2019 | Schulz | F16B 2/245 |
| D861,471 S | 10/2019 | Ild | |
| 10,507,771 B2 | 12/2019 | Santillan | |
| D876,942 S | 3/2020 | Kuhl | |
| 10,868,413 B1 | 12/2020 | Anshu | |
| 11,005,248 B2 | 5/2021 | Fioriello | |
| 11,342,733 B2 | 5/2022 | Oh | |
| 11,355,906 B2* | 6/2022 | Laughlin | H02G 3/12 |
| 2005/0176278 A1 | 8/2005 | Cheatham | |
| 2010/0252552 A1 | 10/2010 | Nikayin | |
| 2017/0125990 A1 | 5/2017 | Smith | |
| 2021/0281056 A1 | 9/2021 | Oh | |
| 2022/0037868 A1 | 2/2022 | Taylor | |
| 2022/0243404 A1 | 8/2022 | Janson | |

FOREIGN PATENT DOCUMENTS

| | | |
|---|---|---|
| CA | 2484132 C | 2/2011 |
| CN | 203233118 U | 10/2013 |
| CN | 103427058 B | 8/2016 |
| CN | 206639738 U | 11/2017 |
| CN | 207265581 U | 4/2018 |
| CN | 110943411 A | 3/2020 |
| CN | 211046375 U | 7/2020 |
| CN | 211428837 U | 9/2020 |
| CN | 211629791 U | 10/2020 |
| CN | 212565205 U | 2/2021 |
| CN | 214379877 U | 10/2021 |
| CN | 215009462 U | 12/2021 |
| EM | 002285056-0002 | 8/2013 |
| GR | 1007024 B | 10/2010 |
| IN | 700000000256440 | 7/2014 |
| IN | 700000000256441 | 8/2014 |
| JP | 2008215007 A | 9/2008 |
| KR | 101360103 B1 | 2/2014 |
| KR | 101364976 B1 | 2/2014 |
| KR | 3007348800000M01 | 3/2014 |
| KR | 101762419 B1 | 8/2017 |
| KR | 20180079691 A | 7/2018 |
| KR | 20190010205 A | 1/2019 |
| KR | 20190064814 A | 6/2019 |
| KR | 20190095738 A | 8/2019 |
| KR | 20200074494 A | 6/2020 |
| KR | 102222308 B1 | 3/2021 |
| MY | 179252 A | 11/2020 |
| WO | WO 9112461 A1 | 8/1991 |
| WO | WO 2018218312 A1 | 12/2018 |

OTHER PUBLICATIONS

T-Grid Mounting Clip for Heavy Duty Telescoping Box Bracket, available at https://www.erico.com/part.asp?part=TBTG#, downloaded on Jan. 25, 2024, 2 pages.
SSB-TBAR, Simple support bracket with T-Bar drop ceiling Mounting clips, available at https://www.orbitelectric.com/ssb-tbar.html, downloaded on Jan. 25, 2024, 2 pages.
International search report and Written Opinion received for PCT Application No. PCT/EP2024/025048, 10 pages, Apr. 29, 2024.

* cited by examiner

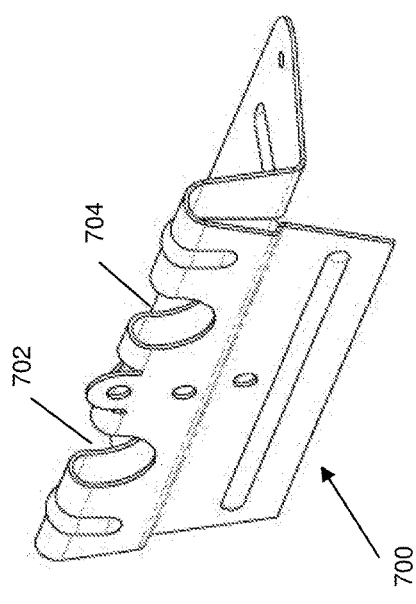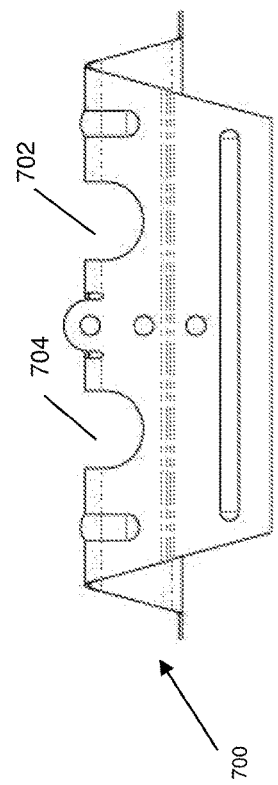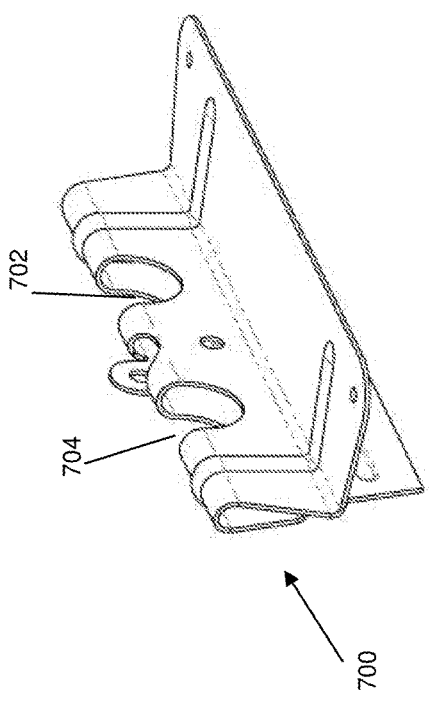

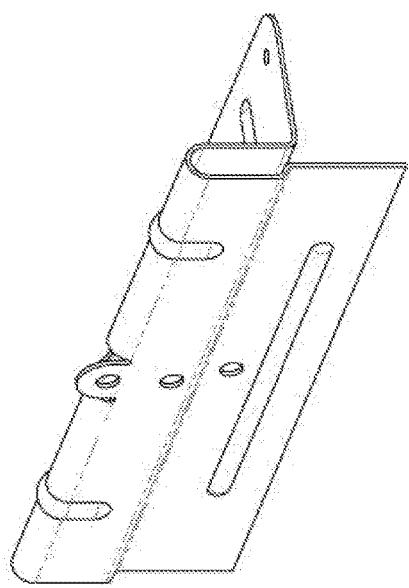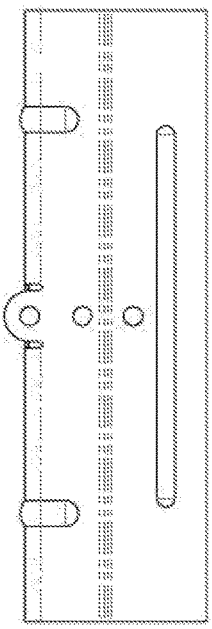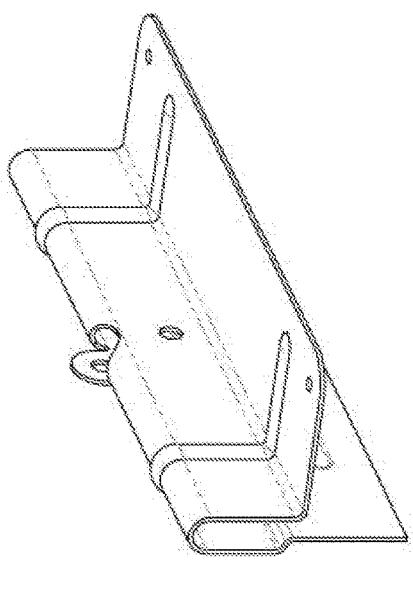
FIG. 8A
FIG. 8B
FIG. 8C

US 12,483,016 B2

ACOUSTIC TEE MOUNTING CLIP FOR ELECTRICAL BOX SUPPORT BRACKET

CROSS-REFERENCE TO RELATED APPLICATIONS

This application claims the benefit under 35 U.S.C. § 119(e) of U.S. Provisional Patent Application No. 63/481,673, filed on Jan. 26, 2023, the content of which is hereby incorporated by reference in its entirety.

BACKGROUND

The present disclosure relates generally to ceiling support systems and, more particularly, to an improved acoustic tee mounting clip for an electrical box support bracket.

Electrical boxes and other components are secured to ceiling structures and other supporting systems commonly found in buildings. Typically, mounting hardware is used to couple ceiling members defining a ceiling grid system to other brackets holding the electrical boxes or other components. Current mounting hardware is not stable and inefficiently manufactured.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, without departing from the scope of this disclosure.

FIGS. 7A-7C illustrate various views of another example acoustic tee mounting clip for the electrical box support bracket system of FIGS. 1A-1B, according to one or more aspects of the present disclosure.

FIGS. 8A-8C illustrate various views of another example acoustic tee mounting clip for the electrical box support bracket system of FIGS. 1A-1B, according to one or more aspects of the present disclosure.

DETAILED DESCRIPTION

Figure 1A:
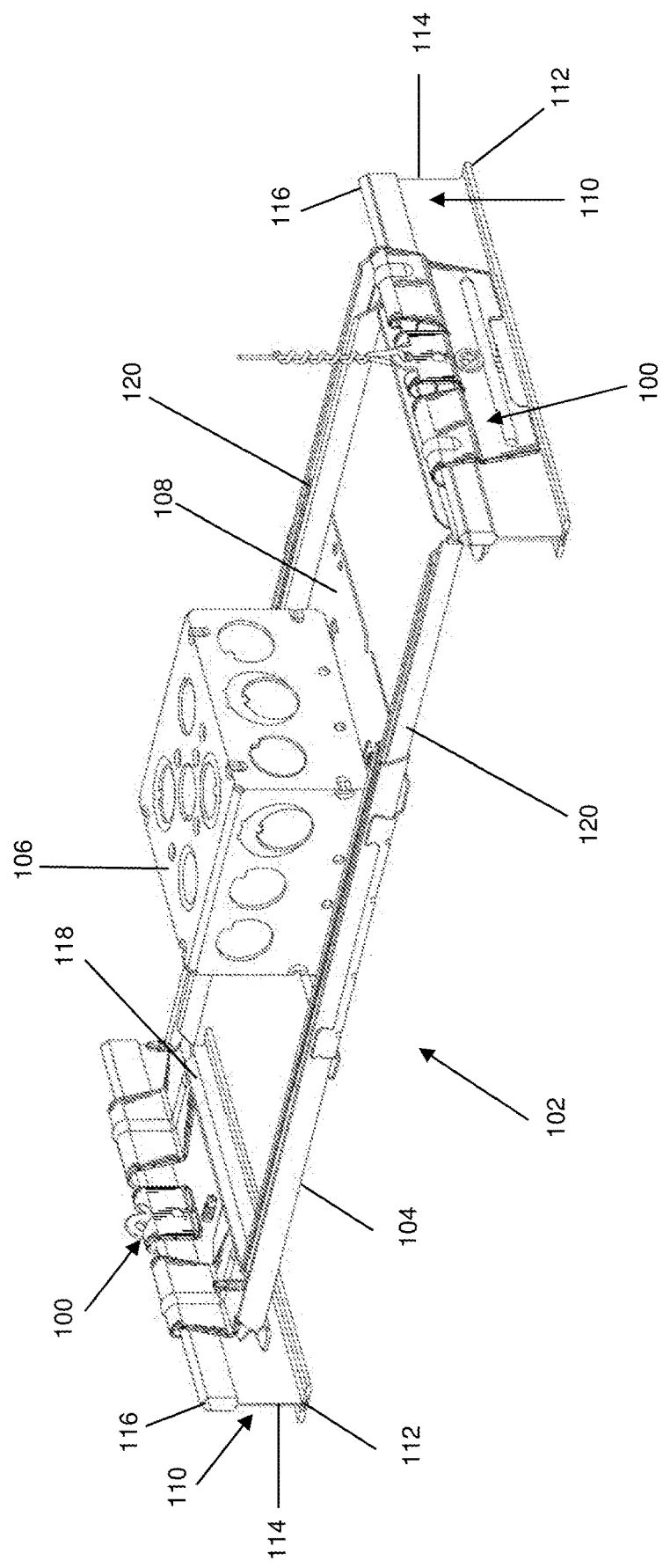
FIGS. 1A and 1B illustrate perspective views of an electrical box support bracket system, according to one or more aspects of the present disclosure.

Illustrative embodiments of the present invention are described in detail herein. In the interest of clarity, not all features of an actual implementation may be described in this specification. It should be appreciated that in the development of any such actual embodiment, numerous implementation-specific decisions may be made to achieve the specific implementation goals, which may vary from one implementation to another. Moreover, it will be appreciated that such a development effort might be complex and time-consuming but would nevertheless be a routine undertaking for those of ordinary skill in the art having the benefit of the present disclosure.

Throughout this disclosure, a reference numeral followed by an alphabetical character refers to a specific instance of an element and the reference numeral alone refers to the element generically or collectively. Thus, as an example (not shown in the drawings), widget "1a" refers to an instance of a widget class, which may be referred to collectively as widgets "1" and any one of which may be referred to generically as a widget "1". In the figures and the description, like numerals are intended to represent like elements.

The terms "couple" or "couples," as used herein, are intended to mean either an indirect or direct connection. Thus, if a first device couples to a second device, that connection may be through a direct connection, or through an indirect electrical connection or a shaft coupling via other devices and connections.

To facilitate a better understanding of the present disclosure, the following examples of certain embodiments are given. In no way should the following examples be read to limit, or define, the scope of the disclosure. Embodiments described below with respect to one implementation are not intended to be limiting.

Generally, it may be useful to secure or support components specifically relative to T-grid ceiling structures, in which ceiling members typically include a base and a vertical stem extending upwardly from the base. Operators may be required to stock many different sizes of brackets to accommodate different sizes of T-grid stems or supporting brackets.

Figure 1B:
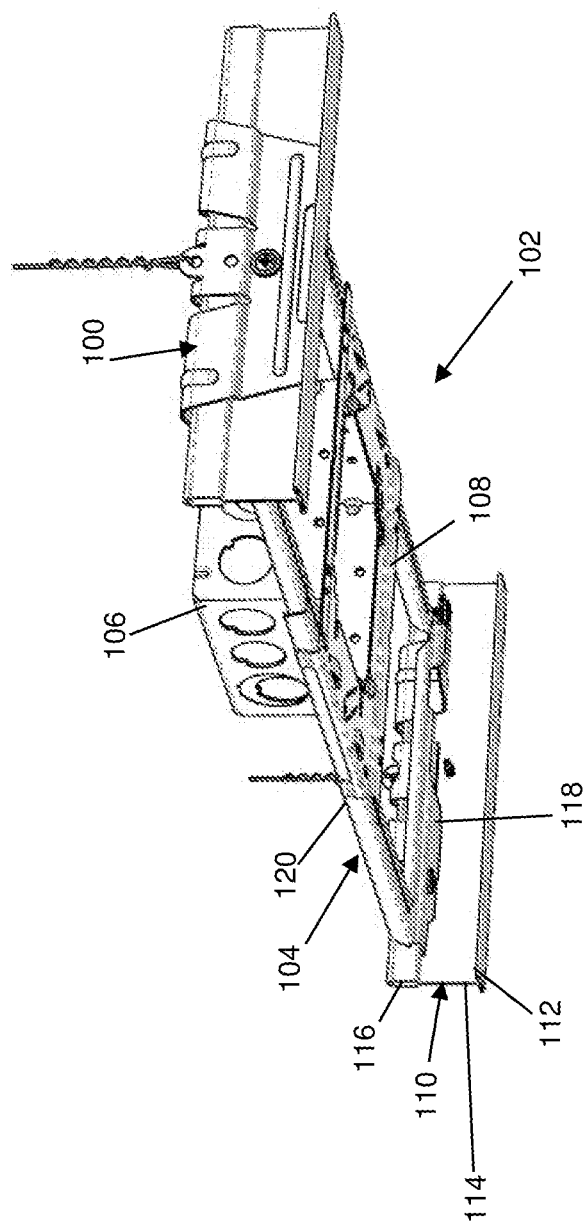

The present disclosure provides an acoustic tee mounting clip intended to secure electrical boxes to ceiling structures, such as T-grid ceiling structures. In other embodiments, the principles disclosed herein can be used with support structures intended to secure any variety of mountable components, including light fixtures, vents, audio devices, fire alarms, and the like. Similarly, although a given example of a T-grid structure is illustrated in FIGS. 1A-1B, some embodiments can be used with for other T-grid structures (e.g., with longer or shorter brackets supporting the electrical box) or otherwise.

The present disclosure generally provides a bracket system for mounting and adjustably securing an electrical box or other object to a ceiling structure. For example, in the embodiment illustrated in FIGS. 1A-1B, a pair of acoustic tee mounting clips 100 are configured to be used in a bracket system 102 having a support structure 104 for securing an electrical box 106. FIG. 1A illustrates a top perspective view of the bracket system 102, and FIG. 1B illustrates a bottom perspective view of the bracket system 102. In embodiments, the support structure 104 may be a telescoping ceiling bracket, however alternative structures or brackets may be used. The support structure 104 is generally provided to support an object (e.g., the electrical box 106) at a particular height relative to other components within the bracket system 102. Although the specific embodiments discussed herein illustrate the support structure 104 supporting the electrical box 106 with a mounting bracket 108, it should be understood that other brackets or structures may be used.

Each one of the acoustic tee mounting clips 100 may be configured such that they may secure the support structure 104 to a ceiling structure. The ceiling structure may be a T-grid system comprising two ceiling members 110, as illustrated. Without limitations, the ceiling members 110 may each be a T-bar, comprising a base 112, a stem 114, and an enlarged end 116 at a top end of the stem 114. The stem 114 may be disposed perpendicular to and extend from the base 112. Although the bracket system 102 is illustrated with two acoustic tee mounting clips 100, any number of acoustic tee mounting clips may be used. For example, the bracket system 102 may include one, three, or four mounting brackets. Further, in some embodiments, sets of substantially identical acoustic tee mounting clips may be used to simplify installation procedures and reduce complications for inventory management. In this regard, only one of the acoustic tee mounting clips 100 will be described in detail below, although such description is applicable to additional acoustic tee mounting clips.

As illustrated, the support structure 104 may be a ceiling bracket that is substantially rectangular in shape and includes two ends 118 connected by two supporting bars 120. The two supporting bars 120 may extend substantially parallel to each other and define a support section that is provided to support components, such as the electrical box 106 via the mounting bracket 108. Further, the two supporting bars 120 may be telescoping (i.e., adjustable length). The two ends 118 may be disposed opposite from each other and couple the ends of the supporting bars 120 together. In embodiments, each of the ends 118 may be an elongated, substantially planar section that is configured to be received by and secured to the acoustic tee mounting clips 100, wherein the acoustic tee mounting clips 100 may couple the ends 118 to the ceiling members 110. Each end 118 may comprise one or more holes configured to receive a fastener for coupling with the acoustic tee mounting clips.

Figure 2:
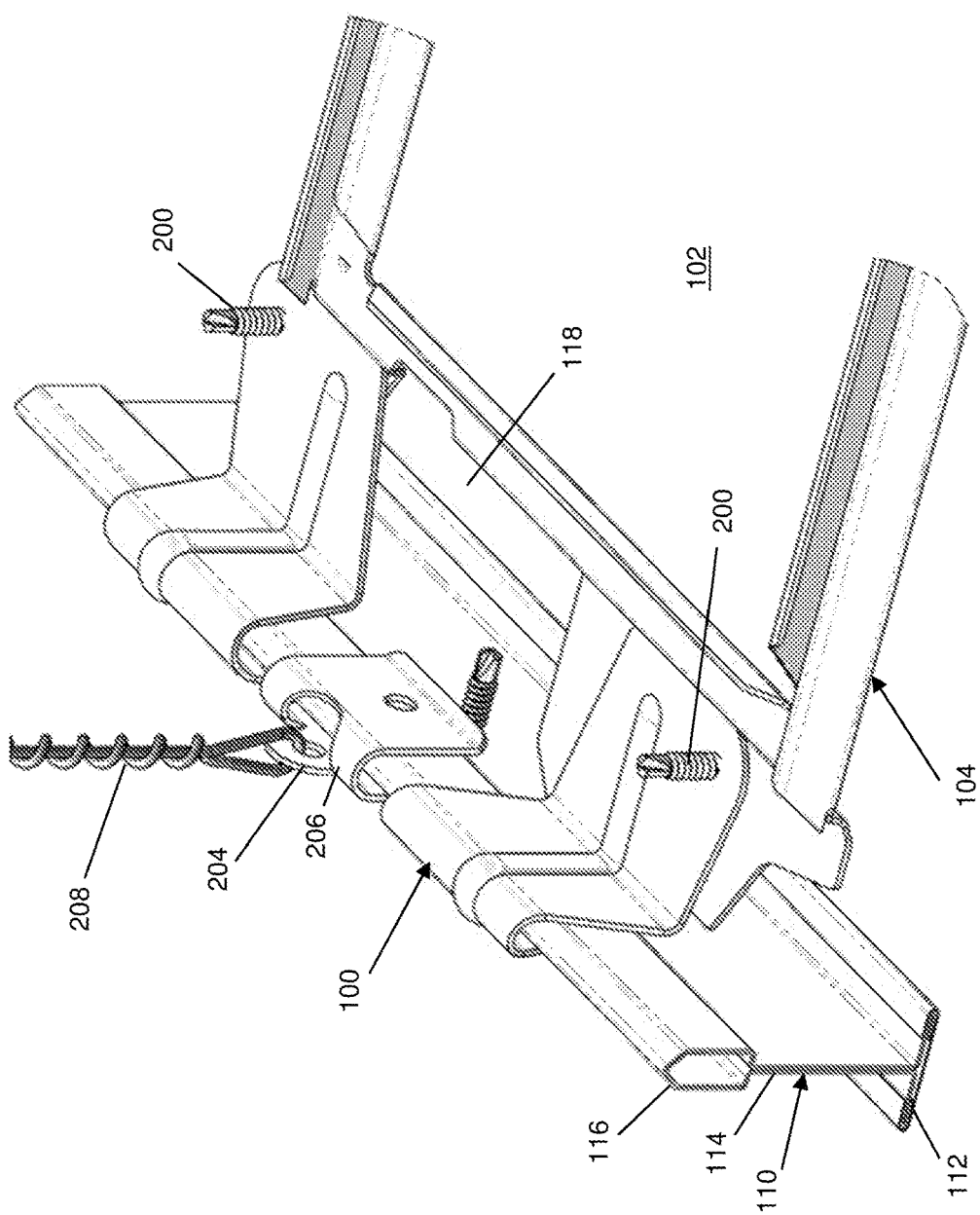
FIG. 2 illustrates a portion of a perspective view of FIGS. 1A-1B, according to one or more aspects of the present disclosure.
Figure 3:
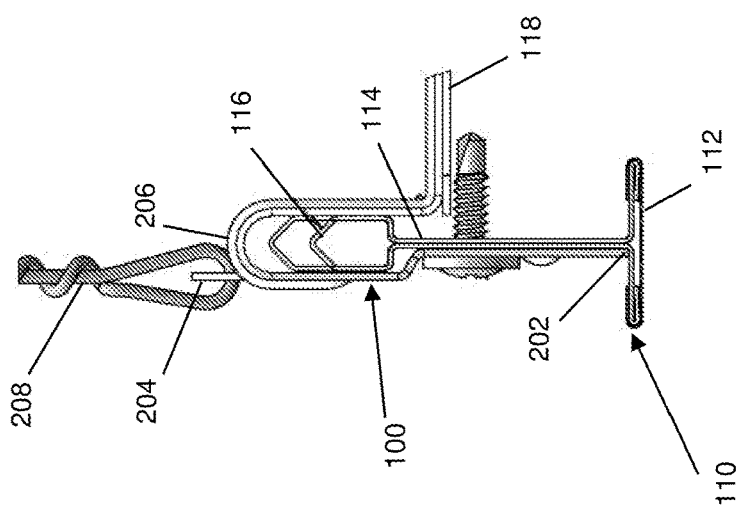
FIG. 3 illustrates a side view of FIGS. 1A-1B, according to one or more aspects of the present disclosure.
Figure 4A:
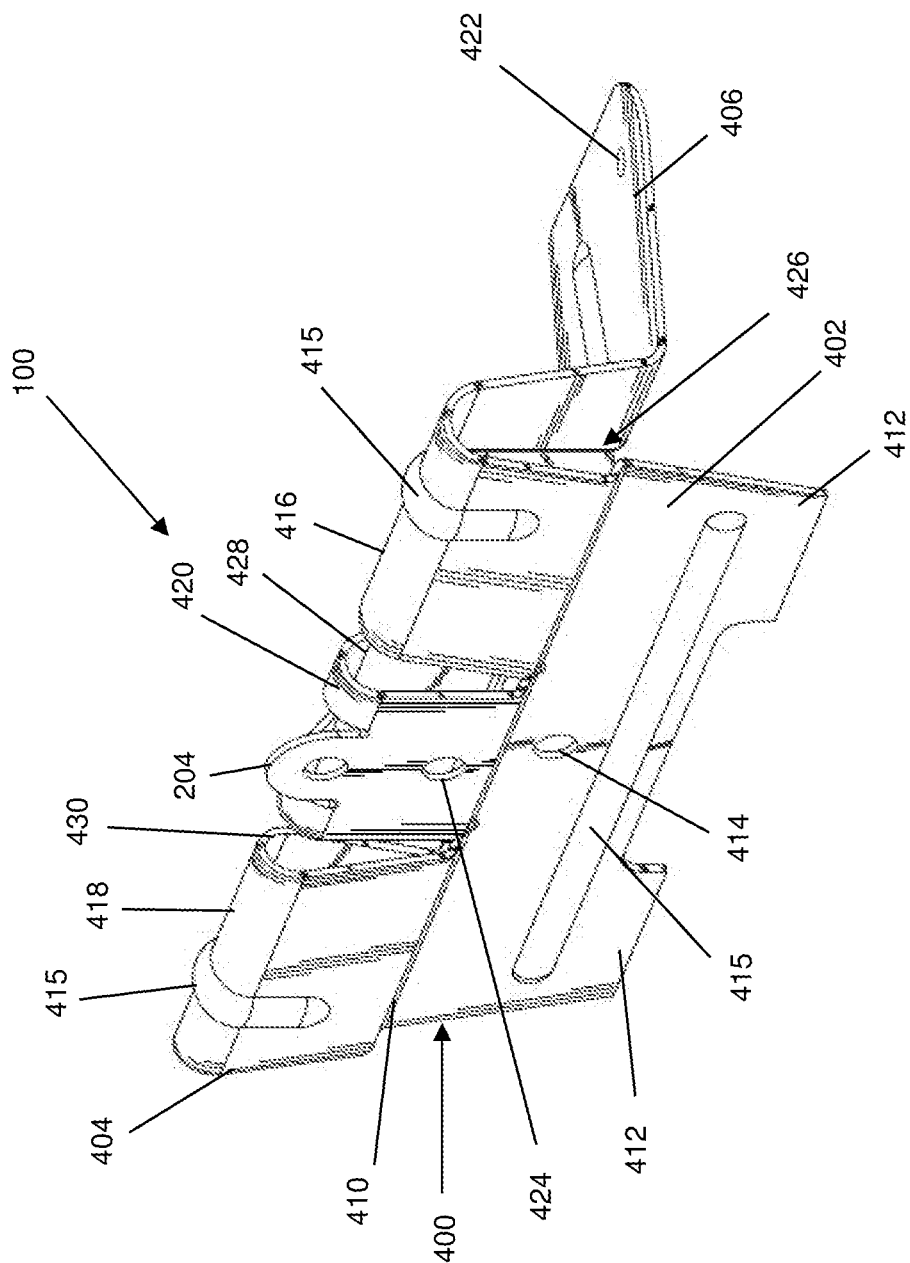
FIGS. 4A-4D illustrate various views of an acoustic tee mounting clip for the electrical box support bracket system of FIGS. 1A-1B, according to one or more aspects of the present disclosure.
Figure 4B:
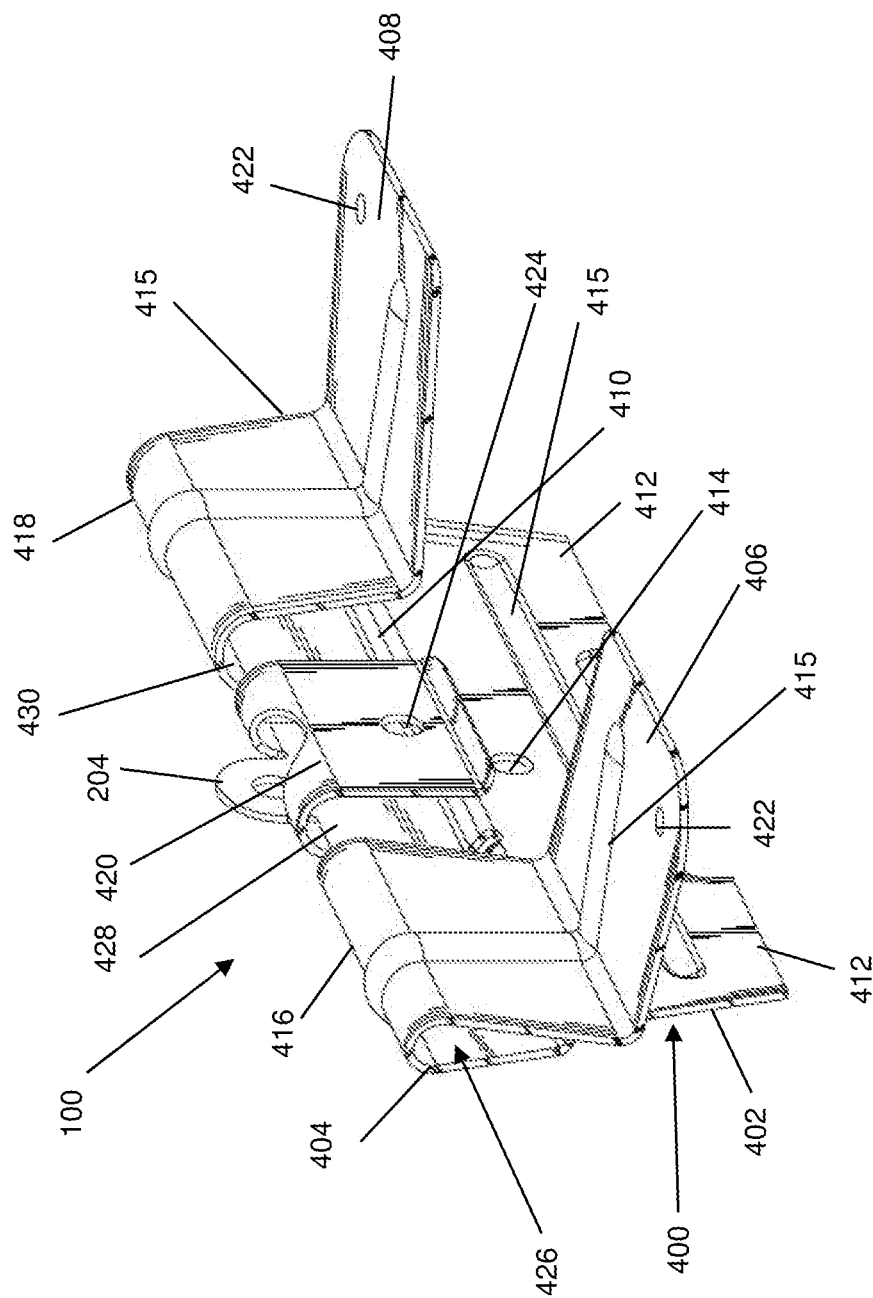
Figure 4C:
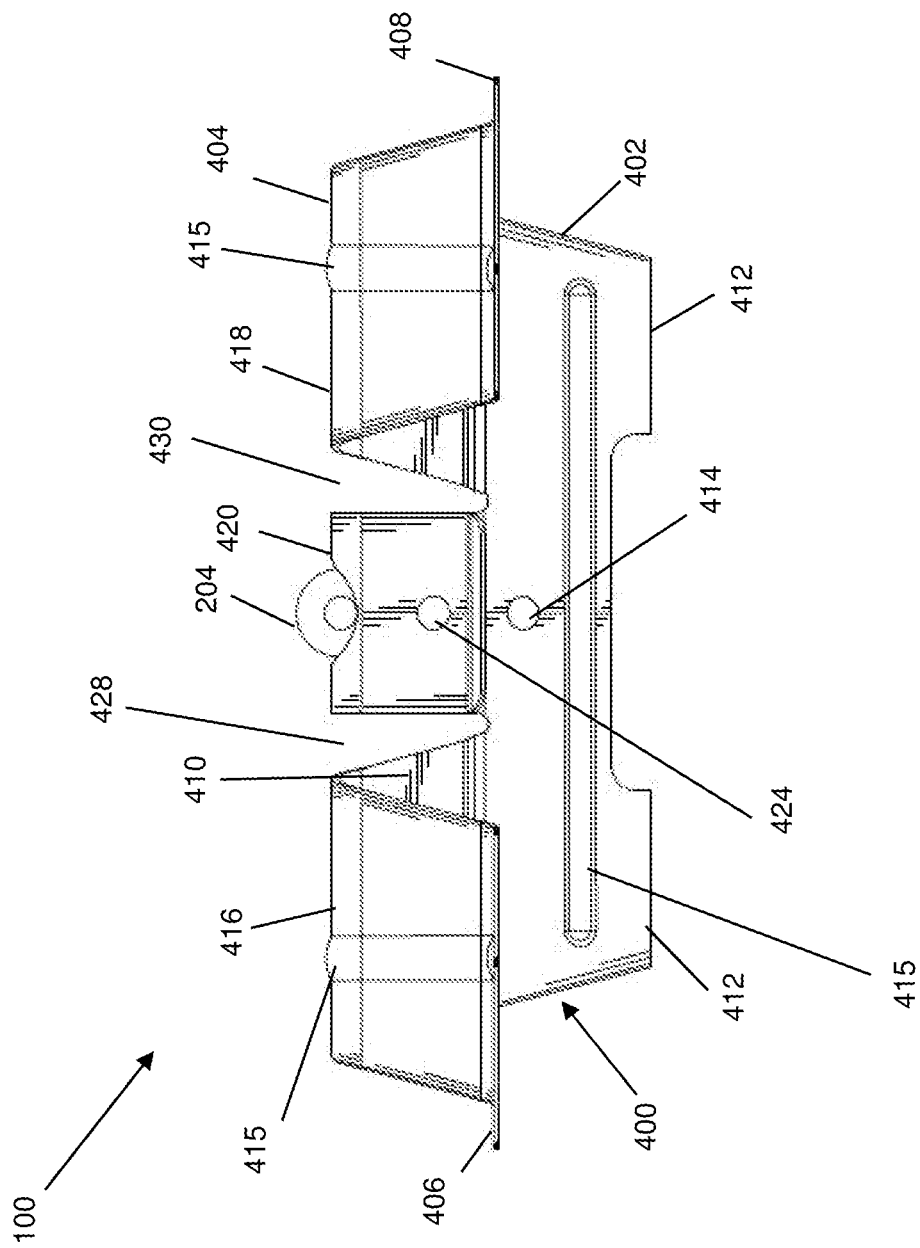
Figure 4D:
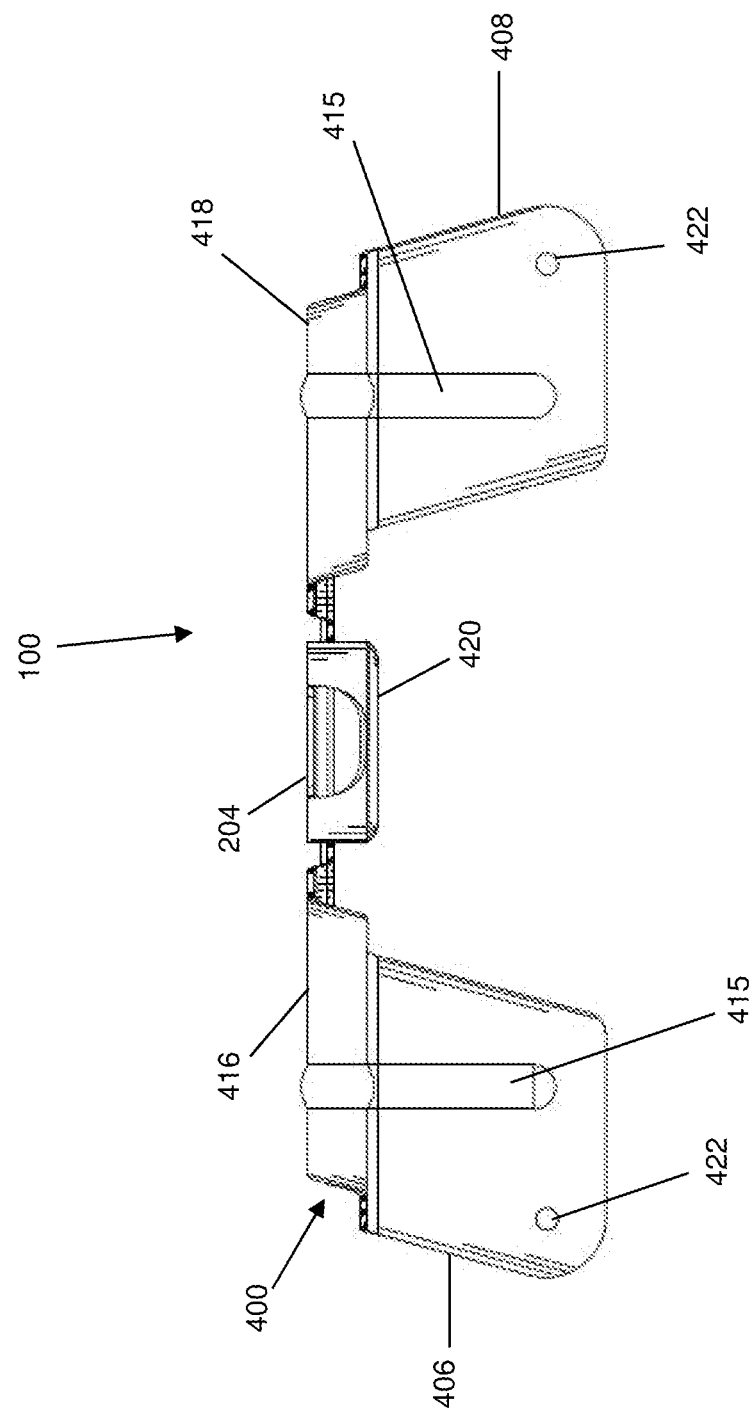

FIGS. 2-3 illustrate one of the ends 118 of the bracket system 102, wherein one of the pair of acoustic tee mounting clips 100 couples the ceiling member 110 to the support structure 104. FIG. 2 illustrates a portion of the perspective view of FIG. 1A, and FIG. 3 illustrates a side view of FIG. 2. As shown, the acoustic tee mounting clip 100 may be coupled to the end 118 via one or more fasteners 200. The end 118 may comprise a hole disposed proximate to each of the supporting bars 120 (referring to FIGS. 1A-1B). In other embodiments, one or more holes may be disposed about any other suitable location along the end 118 (such as at a central or middle location). The acoustic tee mounting clip 100 may comprise one or more holes (described further below) disposed at approximately the same distance as the holes defined in the end 118. As the acoustic tee mounting clip 100 is aligned with the end 118, the holes of the acoustic tee mounting clip 100 may align with those of the end 118, and the fasteners 200 may be inserted through both to secure the acoustic tee mounting clip 100 to the end 118.

In embodiments, the acoustic tee mounting clip 100 may be coupled to the end 118 before or after being disposed over the ceiling member 110. Each acoustic tee mounting clip 100 may be configured to receive at least a portion of the ceiling member 110, such as the enlarged end 116 and/or stem 114. As acoustic tee mounting clip 100 is disposed onto the ceiling member 110, a bottom end 202 of the acoustic tee mounting clip 100 may come to rest and abut a shoulder formed between the stem 114 and the base 112. The acoustic tee mounting clip 100 may comprise an attachment point 204 disposed at a top 206 of the acoustic tee mounting clip 100 configured to receive cables or wires provided by an external structure to transfer the weight of a support structure and any component provided thereon to the external structure, thereby decreasing loads on ceiling members 110. For example, a hanging wire 208 may couple to the acoustic tee mounting clip 100 via attachment point 204 and support the weight of the acoustic tee mounting clip 100 and any other components coupled thereto. Attachment point 204 may be integrally formed or manufactured separately from acoustic tee mounting clip 100. As shown, attachment point 204 may be a circular tab protruding from the top 206 and defining a hole to receive the hanging wire 208, but attachment point 204 is not limited to such a shape.

FIGS. 4A-4D illustrate various views of the acoustic tee mounting clip 100. The acoustic tee mounting clip 100 may be configured to securely couple a bracket system 102 (referring to FIGS. 1A-1B) to a ceiling structure, such as to one or more ceiling members 110 (referring to FIGS. 1A-1B). The acoustic tee mounting clip 100 may be any suitable size, height, shape, and any combinations thereof. As illustrated, the acoustic tee mounting clip 100 may generally comprise a "W"-shape. Further, the acoustic tee mounting clip 100 may comprise any suitable materials, such as metals, nonmetals, polymers, composites, and any combinations thereof. In embodiments, the acoustic tee mounting clip 100 may comprise of material having enough elastic properties to be disposed over the ceiling member 110. Without limitations, the acoustic tee mounting clip 100 may comprise of steel. The acoustic tee mounting clip 100 may comprise a body 400 defining portions of the acoustic tee mounting clip 100 as the acoustic tee mounting clip 100 may be manufactured from a singular piece of material via blanking or die stamping.

The body 400 may comprise a lower portion 402, an upper portion 404, a first arm 406, and a second arm 408. The lower portion 402 may be integrally connected to the upper portion 404. In embodiments, both the lower portion 402 and the upper portion 404 may disposed in a vertical direction. In certain embodiments, the lower portion 402 may be offset in a lateral direction from the upper portion 404 by an offset connecting portion 410. The offset connection portion 410 may be disposed between the lower portion 402 and the upper portion 404 and may generally be disposed at an angle with respect to the vertical direction. In embodiments, the upper portion 404 may transition to the lower portion 402 through offset connection portion 410, wherein the offset connection portion 410 may be angled inward such that a portion of the lower portion 402 connected to the offset connection portion 410 is more inward relative to a portion of the upper portion 404 connected to the offset connection portion 410.

The lower portion 402 may generally have a trapezoidal shape, wherein the top of the lower portion 402 adjacent to the offset connection portion 410 may be wider than the bottom of the lower portion 402 (i.e., tapers towards the bottom). For example, the edges of the lower portion 402 may taper toward each other closer to the bottom end 202 (referring to FIG. 3) of the lower portion 402. Further, the lower portion 402 may comprise two legs 412 extending downwards configured to rest against the base 112 (referring to FIGS. 1A-1B) of the ceiling member 110. The lower portion 402 may additionally define a hole 414 at any suitable location, wherein the hole 414 may be configured to receive a fastener to secure the body 400 of acoustic tee mounting clip 100 to the stem 114 (referring to FIGS.

1A-1B) of the ceiling member 110. The body 400 may further comprise one or more ribs 415 disposed along the lower portion 402 and/or upper portion 404. The one or more ribs 415 may be formed along the lower portion 402 and/or upper portion 404 to increase the strength and stiffness proximate to that area. In embodiments, at least one rib 415 may be formed along the body 400 through any suitable plastic deformation process, such as cold working or hot working.

The upper portion 404 may comprise a first bent portion 416, a second bent portion 418, a central tab 420, the first and second arms 406, 408, and the attachment point 204. The first bent portion 416 may be disposed at one side of the upper portion 404, and the second bent portion 418 may be disposed at an opposing side. The first bent portion 416 may be integral to the body 400 and may extend from the upper portion 404. Part of the first bent portion 416 may be bent so as to be substantially perpendicular to the remainder of the body 400 (i.e., the upper and lower portions 404, 402). The first bent portion 416 may be further bent in a downwards direction wherein that portion of the first bent portion 416 may be disposed substantially parallel to the remainder of the body 400. Likewise, the second bent portion 418 may be integral to the body 400 and may extend from the upper portion 404. Part of the second bent portion 418 may be bent so as to be substantially perpendicular to the remainder of the body 400 (i.e., the upper and lower portions 404, 402). The second bent portion 418 may be further bent in a downwards direction wherein that portion of the second bent portion 418 may be disposed substantially parallel to the remainder of the body 400. In embodiments, the first bent portion 416 and the second bent portion 418 may be configured to rest against the enlarged end 116 of the ceiling member 110 once the acoustic tee mounting clip 100 is disposed over the ceiling member 110.

As illustrated, the first arm 406 may be disposed at a distal end of the first bent portion 416, and the second arm 408 may be disposed at a distal end of the second bent portion 418. Both first and second arms 406, 408 may be disposed perpendicular to the first and second bent portions 416, 418, respectively. Both the first arm 406 and the second arm 408 may bend outward from the distal ends and may be configured to be fastened to a horizontal surface of the support structure 104. There may be a hole 422 defined in each of the first and second arms 406, 408 configured to receive one of the fasteners 200 (referring to FIG. 2) for coupling the acoustic tee mounting clip 100 to the support structure 104 (referring to FIGS. 1A-1B).

In embodiments, the central tab 420 may be disposed between the first bent portion 416 and the second bent portion 418. The central tab 420 may provide the attachment point 204 for the acoustic tee mounting clip 100. Similar to the first and second bent portions 416, 418, the central tab 420 may extend from the upper portion 404, be bent to be partially perpendicular to the upper portion 404, and be bent further to be substantially parallel to the upper portion 404. A hole 424 may be defined in the central tab 420 and may extend through the body at the upper portion 404. The hole 424 may be configured to receive one of the fasteners 200 for coupling the acoustic tee mounting clip 100 to the support structure 104.

The first bent portion 416, second bent portion 418, and central tab 420 may collectively define a channel 426 configured to receive at least a portion of the ceiling member 110, such as the enlarged end 116. The channel 426 may have an open side facing a downwards direction generally around the location of the offset connection portion 410. In embodiments, a user may bend at least a portion of the acoustic tee mounting clip 100 in order to insert the enlarged end 116 (referring to FIGS. 1A-1B) into the channel 426. The acoustic tee mounting clip 100 may comprise suitable material having elastic properties, wherein release of the force bending the acoustic tee mounting clip 100 may cause the acoustic tee mounting clip 100 to resume an initial configuration. The channel 426 may be any suitable size, height, and/or shape. In embodiments, the channel 426 may comprise a shape configured to accommodate the enlarged end 116.

As illustrated, the upper portion 404 may comprise a first cut-out 428 and a second cut-out 430. Both the first and second cut-outs 428, 430 may be spaces wherein portions of the body 400 have been removed. The first cut-out 428 may be disposed between the first bent portion 416 and the central tab 420, and the second cut-out 430 may be disposed between the central tab 420 and the second bent portion 418. Each one of the first and second cut-outs 428, 430 may be any suitable size, height, and/or shape. As illustrated, the both the first cut-out 428 and the second cut-out 430 may comprise generally a triangular shape, wherein the sides closest to the central tab 420 are straight, and each cut-out 428, 430 extends to either the first bent portion 416 or second bent portion 418. The first cut-out 428 and second cut-out 430, as well as the legs 412, may provide the acoustic tee mounting clip 100 with the "W"-shape. In embodiments, the presence of the first cut-out 428 and second cut-out 430 does not affect the functionality of the channel 426. However, the first and second cut-outs 428, 430 may provide sufficient flexibility to the upper portion 404 when elastically deforming the acoustic tee mounting clip 100 for securing to the ceiling member 110.

Figure 5:
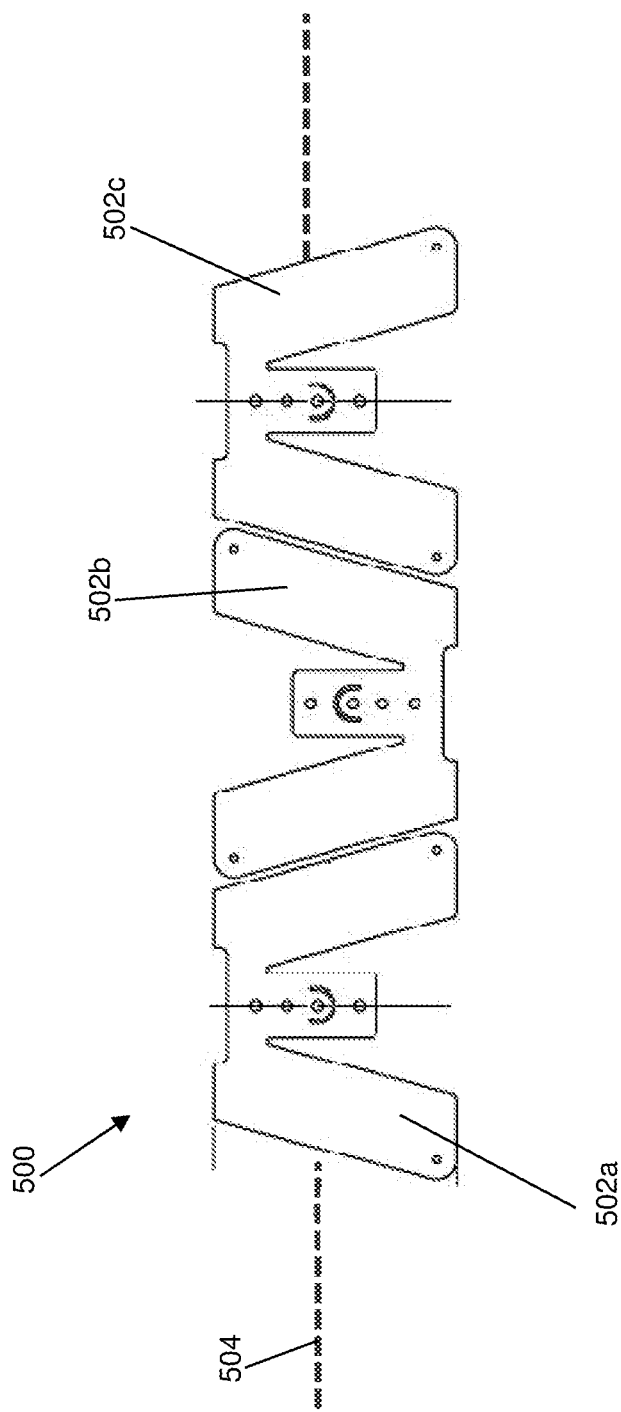
FIG. 5 illustrates a plan view of a die feed for the acoustic tee mounting clip of FIGS. 4A-4D during manufacturing operations, according to one or more aspects of the present disclosure.

Reference will now be made to FIG. 5 to describe set-up of manufacturing the acoustic tee mounting clip 100 of FIGS. 4A-4D. FIG. 5 illustrates a plan view of a die feed 500 for manufacturing the acoustic tee mounting clip 100. In embodiments, the die feed 500 may comprise a sheet of material comprising of nested designs 502a, 502b, and 502c. During operations, the die feed 500 may be inserted into/through one or more dies to produce the shapes illustrated as nested designs 502a-502c. Further processing of the nested designs 502a-502c may produce multiple acoustic tee mounting clips 100. By rotating every other nested design 502a-502c by 180° about the axis 504, a nested sequence may be produced that can result in improved cost savings and material utilization. In these embodiments, the acoustic tee mounting clip 100 may be manufactured from a singular, continuous sheet of metal. For example, the lower portion 402 (referring to FIGS. 4A-4D), the upper portion 404 (referring to FIGS. 4A-4D), the first arm 406 (referring to FIGS. 4A-4D), and the second arm 408 (referring to FIGS. 4A-4D) may be formed from a continuous sheet of metal.

Figure 6A:
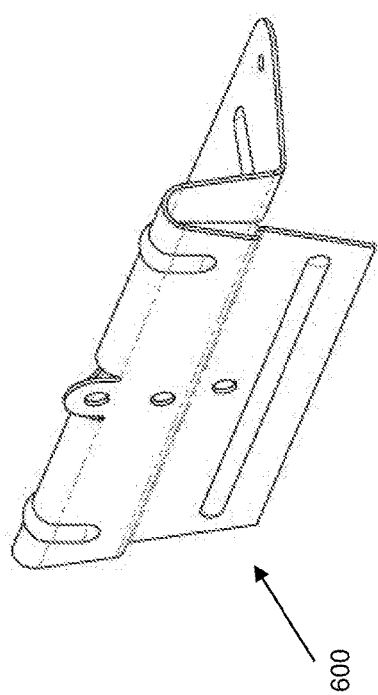
FIGS. 6A-6C illustrate various views of another example acoustic tee mounting clip for the electrical box support bracket system of FIGS. 1A-1B, according to one or more aspects of the present disclosure.
Figure 6B:
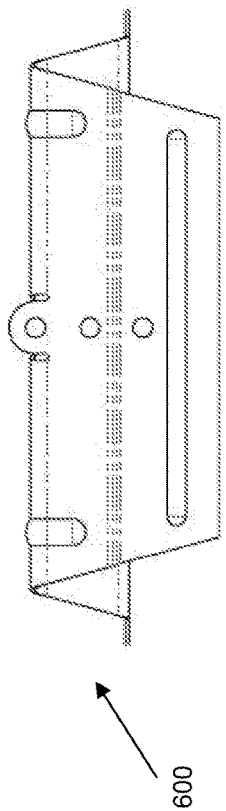
Figure 6C:
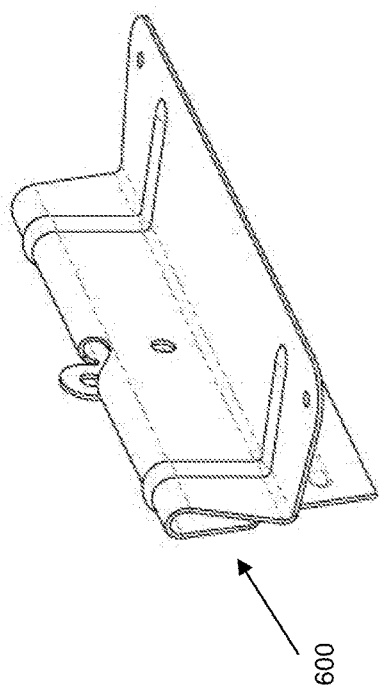

The present disclosure provides for an acoustic tee mounting clip 100 generally having a "W"-shape, as shown in FIGS. 1A-1B, however, the present disclosure is not limited to such shapes. For example, FIGS. 6A-6C illustrate a different embodiment of the acoustic tee mounting clip. As shown, an acoustic tee mounting clip 600 may not have the first cut-out 428 and second cut-out 430 (referring to FIGS. 4A-4D). In these embodiments, central tab 420 (referring to FIGS. 4A-4D) may be integrally connected to the first bent portion 416 (referring to FIGS. 4A-4D) and the second bent portion 418 (referring to FIGS. 4A-4D), and the channel 426 (referring to FIGS. 4A-4D) may be uniform and uninterrupted. Further, the first arm 406 (referring to FIGS. 4A-4D) may be integrally connected to the second arm 408 (referring to FIGS. 4A-4D). FIGS. 7A-7C illustrate another embodiment of the acoustic tee mounting clip. The illustrated acoustic tee mounting clip 700 may comprise a first cut-out 702 and a second cut-out 704. First and second cut-outs 702, 704 may be similar to first and second cut-outs 428, 430 (referring to FIGS. 4A-4D) except in shape. As shown, first and second cut-outs 702, 704 may comprise the shape of a portion of a circle, such as a semicircle. Like in FIGS. 6A-6C, the first arm 406 (referring to FIGS. 4A-4D) may be integrally connected to the second arm 408 (referring to FIGS. 4A-4D) of acoustic tee mounting clip 700.

Figure 9A:
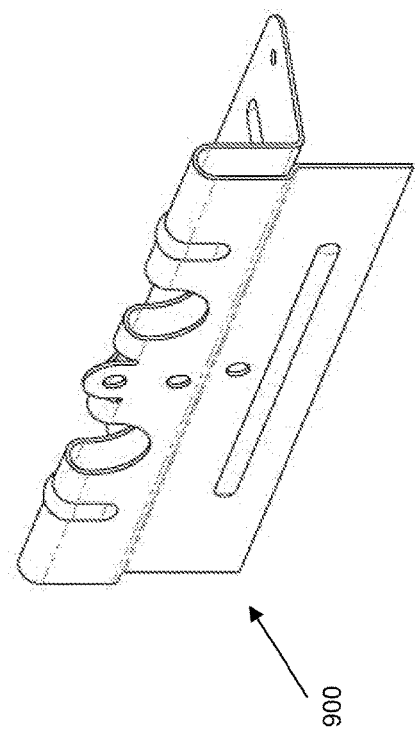
FIGS. 9A-9C illustrate various views of another example acoustic tee mounting clip for the electrical box support bracket system of FIGS. 1A-1B, according to one or more aspects of the present disclosure.
Figure 9B:
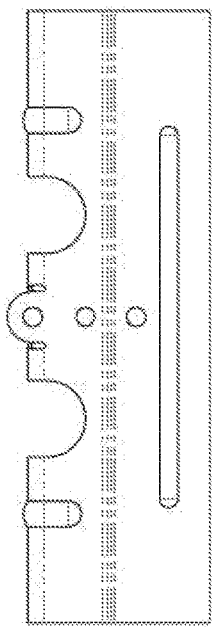
Figure 9C:
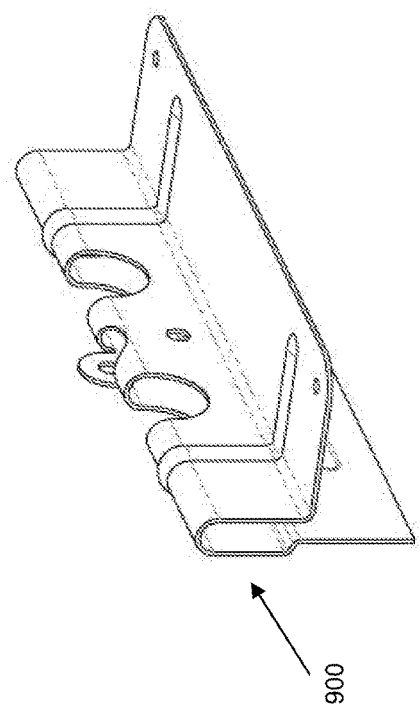

FIGS. 8A-8C illustrate another embodiment of the acoustic tee mounting clip. The illustrated acoustic tee mounting clip 800 may generally be the same as acoustic tee mounting clip 600 (referring to FIGS. 6A-6C) except for the shape of the lower portion 402 (referring to FIGS. 4A-4D). As illustrated, the lower portion 402 of acoustic tee mounting clip 800 may generally be rectangular instead of trapezoidal, wherein the shape tapers downward. FIGS. 9A-9C illustrate another embodiment of the acoustic tee mounting clip. The illustrated acoustic tee mounting clip 900 may generally be the same as acoustic tee mounting clip 700 (referring to FIGS. 7A-7C) except for the shape of the lower portion 402 (referring to FIGS. 4A-4D). As illustrated, the lower portion 402 of acoustic tee mounting clip 900 may generally be rectangular instead of trapezoidal, wherein the shape tapers downward.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed:

1. An acoustic tee mounting clip, comprising:
   a body having a lower portion, an upper portion, a first arm, and a second arm,
      wherein the upper portion transitions to the lower portion through an offset connection portion, the offset connection portion is angled inward such that a portion of the lower portion connected to the offset connection portion is more inward relative to a portion of the upper portion connected to the offset connection portion,
      wherein the upper portion comprises a first bent portion, a second bent portion, and a first cut-out, wherein the first cut-out is disposed between the first bent portion and the second bent portion,
      wherein the first arm and the second arm are respectively disposed at distal ends of the first bent portion and the second bent portion, wherein the first arm and the second arm bend outward from the distal ends and are configured to be fastened to a horizontal surface of a support structure.

2. The acoustic tee mounting clip of claim 1, wherein a bottom end of the lower portion comprises two legs configured to rest against a base of a ceiling member.

3. The acoustic tee mounting clip of claim 1, wherein edges of the lower portion taper toward each other closer to an end of the lower portion.

4. The acoustic tee mounting clip of claim 1, wherein the first bent portion and the second bent portion are configured to rest against an enlarged end of a stem of a ceiling member.

5. The acoustic tee mounting clip of claim 1, wherein the upper portion comprises:
   a second cut-out; and
   a central tab disposed between the first bent portion and the second bent portion, wherein the central tab provides an attachment point for the acoustic tee mounting clip.

6. The acoustic tee mounting clip of claim 5, wherein the first cut-out is disposed between the first bent portion and the central tab, and wherein the second cut-out is disposed between the central tab and the second bent portion.

7. The acoustic tee mounting clip of claim 5, wherein the first bent portion, the second bent portion, and the central tab collectively define a channel configured to receive an enlarged end of a stem of a ceiling member.

8. The acoustic tee mounting clip of claim 1, wherein at least one rib is formed along the lower portion and/or the upper portion.

9. The acoustic tee mounting clip of claim 1, wherein the lower portion, the upper portion, the first arm, and the second arm are formed from a continuous sheet of metal.

10. A bracket system, comprising:
    a ceiling bracket;
    at least one ceiling member; and
    at least one acoustic tee mounting clip configured to couple the ceiling bracket to the at least one ceiling member, wherein the at least one acoustic tee mounting clip comprises:
       a body having a lower portion, an upper portion, a first arm, and a second arm,
          wherein the upper portion transitions to the lower portion through an offset connection portion, the offset connection portion is angled inward such that a portion of the lower portion connected to the offset connection portion is more inward relative to a portion of the upper portion connected to the offset connection portion,
          wherein the upper portion comprises a first bent portion, a second bent portion, and a first cut-out, wherein the first cut-out is disposed between the first bent portion and the second bent portion,
          wherein the first arm and the second arm are respectively disposed at distal ends of the first bent portion and the second bent portion, wherein the first arm and the second arm bend outward from the distal ends and are configured to be fastened to a horizontal surface of the ceiling bracket.

11. The bracket system of claim 10, further comprising an electrical box coupled to the ceiling bracket through a mounting bracket.

12. The bracket system of claim 11, further comprising a hanging wire coupled to the at least one acoustic tee mounting clip via an attachment point configured to support a weight of the at least one acoustic tee mounting clip, the ceiling bracket, and the electrical box.

13. The bracket system of claim 10, wherein a distal end of the lower portion comprises two legs configured to rest against a base of a ceiling member.

14. The bracket system of claim 10, wherein edges of the lower portion taper toward each other closer to an end of the lower portion.

15. The bracket system of claim 10, wherein the first bent portion and the second bent portion are configured to rest against an enlarged end of a stem of a ceiling member.

16. The bracket system of claim 10, wherein the upper portion comprises:
   a second cut-out; and
   a central tab disposed between the first bent portion and the second bent portion, wherein the central tab provides an attachment point for the acoustic tee mounting clip.

17. The bracket system of claim 16, wherein the first cut-out is disposed between the first bent portion and the central tab, and wherein the second cut-out is disposed between the central tab and the second bent portion.

18. The bracket system of claim 16, wherein the first bent portion, the second bent portion, and the central tab collectively define a channel configured to receive an enlarged end of a stem of a ceiling member.

19. The bracket system of claim 10, wherein at least one rib is formed along the lower portion and/or the upper portion.

20. The bracket system of claim 10, wherein the lower portion, the upper portion, the first arm, and the second arm are formed from a continuous sheet of metal.

* * * * *